(12) United States Patent
Juels

(10) Patent No.: US 7,750,793 B2
(45) Date of Patent: Jul. 6, 2010

(54) METHODS AND APPARATUS FOR RFID DEVICE AUTHENTICATION

(75) Inventor: Ari Juels, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 780 days.

(21) Appl. No.: 11/191,633

(22) Filed: Jul. 28, 2005

(65) Prior Publication Data
US 2006/0022799 A1 Feb. 2, 2006

Related U.S. Application Data

(60) Provisional application No. 60/591,982, filed on Jul. 29, 2004, provisional application No. 60/660,771, filed on Mar. 11, 2005.

(51) Int. Cl.
*H04Q 5/22* (2006.01)
*G08B 13/14* (2006.01)
(52) U.S. Cl. .................. 340/10.5; 340/10.1; 340/10.51; 340/5.61; 340/572.1; 340/572.3
(58) Field of Classification Search ............... 340/10.5, 340/5.61, 572.1, 572.3, 10.1, 10.51; 713/168; 235/380
See application file for complete search history.

(56) References Cited

U.S. PATENT DOCUMENTS

| 5,467,081 A | 11/1995 | Drews et al. |
| 6,061,344 A | 5/2000 | Wood, Jr. |
| 6,630,885 B2 * | 10/2003 | Hardman et al. ............ 340/505 |
| 6,724,895 B1 | 4/2004 | Turner et al. |
| 6,933,848 B1 * | 8/2005 | Stewart et al. ........... 340/572.3 |
| 2003/0137403 A1 * | 7/2003 | Carrender et al. .......... 340/10.4 |
| 2004/0066278 A1 | 4/2004 | Hughes et al. |
| 2004/0100359 A1 | 5/2004 | Reade et al. |
| 2004/0100363 A1 | 5/2004 | Lane et al. |

(Continued)

FOREIGN PATENT DOCUMENTS

WO WO03050757 6/2003

(Continued)

OTHER PUBLICATIONS

S.E. Sarma et al., "Radio-Frequency Identification: Security Risks and Challenges," RSA Laboratories, CryptoBytes, vol. 6, No. 1, pp. 1-32, Spring 2003.

(Continued)

*Primary Examiner*—Edwin C Holloway, III
(74) *Attorney, Agent, or Firm*—Ryan, Mason & Lewis, LLP

(57) ABSTRACT

Methods and apparatus are disclosed for use in an RFID system comprising a plurality of RFID devices and at least one reader which communicates with one or more of the devices. In one aspect of the invention, an identifier transmitted by a given one of the RFID devices is received by a reader or by an associated verifier via the reader. At least first and second codes are determined, by the reader or verifier, with the first code being a valid code for the identifier, and the second code being an invalid code for the identifier. The reader, or verifier via the reader, communicates with the given device to determine if the device is able to confirm that the first code is a valid code and the second code is an invalid code.

28 Claims, 3 Drawing Sheets

U.S. PATENT DOCUMENTS

| | | | |
|---|---|---|---|
| 2004/0160324 | A1 | 8/2004 | Stilp |
| 2004/0222878 | A1 | 11/2004 | Juels |
| 2004/0223481 | A1 | 11/2004 | Juels et al. |
| 2004/0233040 | A1* | 11/2004 | Lane et al. .................. 340/5.86 |
| 2005/0017844 | A1* | 1/2005 | Cole .......................... 340/10.1 |
| 2005/0099268 | A1 | 5/2005 | Juels et al. |
| 2005/0114326 | A1* | 5/2005 | Smith et al. .................... 707/3 |

FOREIGN PATENT DOCUMENTS

| | | |
|---|---|---|
| WO | PCT/US05/28839 | 12/2006 |

OTHER PUBLICATIONS

S.A. Weis et al., "Security and Privacy Aspects of Low-Cost Radio Frequency Identification Systems," Proceedings of the First International Conference on Security in Pervasive Computing, 12 pages, 2003.

A. Juels, "Yoking-Proofs' for RFID Tags," PerCom Workshops, IEEE Computer Society, pp. 138-143, 2004.

"EPC™ Radio-Frequency Identity Protocols Class-1 Generation 2 UHF RFID Protocol for Communications at 860 MHz—960 MHz," Version 1.0.8., pp. 1-93, 2005.

J. Stern et al., "Cryptanalysis of the OTM Signature Scheme from FC'02," Financial Cryptography '03, pp. 138-148, Springer-Verlag, LNCS No. 2742, 2003.

A. Juels, "Minimalist Cryptography for Low-Cost RFID Tags," Security in Communication Networks, (SCN 04), pp. 149-164, Springer-Verlag, LNCS No. 3352, 2004.

"23 mm Glass Transponder," Radio Frequency Identification Systems, Texas Instruments, 1 page, Dec. 2001.

"12 mm Wedge Transponder," Radio Frequency Identification Systems, Texas Instruments, 1 page, Dec. 2001.

M. Jakobsson et al., "Security Weaknesses in Bluetooth," 16 pages, 2001.

"Read/Write Transponder," Atmel, 22 pages, Apr. 2003.

S.A. Weis, "Security and Privacy in Radio-Frequency Identification Devices," Master of Science Thesis, MIT, pp. 1-79, May 2003.

A. Juels et al., "Squealing Euros: Privacy Protection in RFID-Enabled Banknotes," Financial Cryptography, Springer-Verlag, 18 pages, 2003.

P. Golle et al., "Universal Re-encryption of Mixnets," Springer-Verlag, 14 pages, 2002.

D.L. Brock, "The Electronic Product Code (EPC): A Naming Scheme for Physical Objects," White Paper, MIT-AUTOID-WH-002, MIT Auto-ID Center, http://www.autoidcenter.org., pp. 1-21, Jan. 2001.

Auto-ID Center, Technical Report, "13.56 MHz ISM Band Class 1 Radio Frequency Identification Tag Interface Specification: Recommended Standard, Version 1.0.0," MIT-AUTOID-TR-011, MIT Auto-ID Center, http://autoidcenter.org, pp. 1-31, Feb. 2003.

S. Garfinkel, "An RFID Bill of Rights," Technology Review, p. 35, Oct. 2002.

S.E. Sarma et al., "RFID Systems, Security & Privacy Implications," White Paper, MIT-AUTOID-WH-014, MIT Auto-ID Center, pp. 1-16, Nov. 2002.

D.W. Engels, "HF Identity Tag Action Group: Scope and Deliverables," Technical Report, MIT-AUTOID-TR-020, MIT Auto-ID Center, pp. 1-5, Jul. 2003.

S.E. Sarma, "Towards the 5¢Tag," White Paper, Technical Report MIT-AUTOID-WH-006, MIT Auto ID Center, pp. 1-19, Nov. 2001.

R. Agrawal et al., "Privacy-Preserving Data Mining," Proc. of the ACM SIGMOD Conference on Management of Data, ACM Press, 12 pages, 2000.

D. Chaum, "Untraceable Electronic Mail, Return Addresses, and Digital Pseudonyms," Communications of the ACM, vol. 24, No. 2, 9 pages, Feb. 1981.

M. Mealling, "Auto-ID Object Name Service (ONS) 1.0," Auto-ID Working Draft, 17 pages, Aug. 2003.

M.G. Reed et al., "Protocols Using Anonymous Connections: Mobile Applications," In Security Protocols, Proceedings of the 5th International Workshop, Springer-Verlag LNCS 1361, 11 pages, 1997.

S. Clark et al., "Auto-ID Savant Specification 1.0," Auto-ID Center, pp. 1-59, Sep. 2003.

Auto-ID Center, Technical Report, "860 MHz-960MHz Class 1 Radio Frequency Identification Tag Radio Frequency & Logical Communication Interface Specification: Recommended Standard, Version 1.0.0," MIT-AUTOID-TR-007, MIT Auto-ID Center, pp. 1-17, Nov. 2002.

J. Collins, "Marks & Spencer Expands RFID Trial," RFID Journal, www.rfidjournal.com, 2 pages, Feb. 10, 2004.

Security Technology, "Where's the Smart Money?," The Economist, www.economist.com, 3 pages, Feb. 7, 2002.

RFID: eWEEK.com Special Report, www.eweek.com, 14 pages, 2004.

K.P. Fishkin et al., "Some Methods for Privacy in RFID Communication,"1st European Workshop on Security in Ad-Hoc and Sensor Networks, ESAS, pp. 1-13, 2004.

United States Food and Drug Administration, "Combating Counterfeit Drugs: A Report of the Food and Drug Administration," pp. 1-45, Feb. 18, 2004.

L.C. Guillou et al., "A Practical Zero-Knowledge Protocol Fitted to Security Microprocessor Minimizing Both Transmission and Memory," Eurocrypt, Springer-Verlag, pp. 123-128, 1998.

J. Hoffstein et al., "NTRU: A Ring-Based Public Key Cryptosystem," ANTS III, Springer-Verlag, 22 pages, 1998.

A. Juels et al.,"The Blocker Tag: Selective Blocking of RFID Tags for Consumer Privacy," 8th ACM Conference on Computer and Communications Security, ACM Press, 16 pages, 2003.

J. Mara, "Euro Scheme Makes Money Talk," Wired News, www.wired.com, 4 pages, Jul. 9, 2003.

D. McCullagh, "RFID Tags: Big Brother in Small Packages," CNET, www.news.com, 3 pages, Jan. 13, 2003.

G. Romen, "Nokia Unveils RFID Phone Reader," RFID Journal, 2 pages, Mar. 17, 2004.

"RFID, Privacy, and Corporate Data," RFID Journal, www.rfidjournal.com, 5 pages, Jun. 2, 2003.

R.L. Rivest, "Chaffing and Winnowing: Confidentiality Without Encryption," CryptoBytes, 8 pages, 1998.

M.I Shamos, "Paper v. Electronic Voting Records—An Assessment," http://euro.ecom.cmu.edu, 20 pages, Apr. 2004.

Texas Instruments, RFID eNews, Issue No. 10, 4 pages, Jul. 2002.

C.P. Wallace, "The Color of Money," Time Europe, 3 pages, Sep. 2001.

"Wal-Mart, DOD Forcing RFID," Wired News, www.wired.com, 3 pages, Nov. 3, 2003.

* cited by examiner

FIG. 3

```
SimpleTagAuth
    T:              $T \leftarrow T_i$
    T → R:          $T$
    R:              if $T = T_x$ for some $1 \leq x \leq N$ then $i \leftarrow x$
                         else output "unknown tag" and halt
    R → T:          PIN-test($K_i$)
    T → R:          $b$
    R:              if $b$ = '1' then output "valid"
                         else output "invalid"
```

FIG. 4

```
BasicTagAuth[q]
    T:              $T \leftarrow T_i$
    T → R:          $T$
    R:              if $T = T_x$ for some $1 \leq x \leq N$ then $i \leftarrow x$
                         else output "unknown tag" and halt
    R:              $(j, \{P_i^{(1)}, P_i^{(2)}, ..., P_i^{(q)}\}) \leftarrow$ GeneratePINSet($i$)[$q$];
                    $M \leftarrow$ "valid"

for $n$ = 1 to $q$ do
    R → T:              PIN-test($P_i^{(n)}$)
    T → R:              $b$
    R:                  if $b$ = '1' and $n \neq j$ then $M \leftarrow$ "invalid";
                        if $b$ = '0' and $n = j$ then $M \leftarrow$ "invalid"
    R:              output $M$;
```

FIG. 5

```
EnhancedTagAuth
    T:              $T \leftarrow T_i$
    T → R:          $T$
    R:              if $T = T_x$ for some $1 \leq x \leq N$ then $i \leftarrow x$, $A \leftarrow A_i$
                    else output "unknown tag" and halt
    R → T:          $A$
    T:              if $A = A_i$ then $K \leftarrow K_i$
                    else $K \leftarrow \phi$
    T → R:          $K$
    R:              if $K = K_i$ then output "valid"
                    else output "invalid"
```

FIG. 6

```
BasicTagAuth⁺[q]
    T:              $T \leftarrow T_i$
    T → R → V:      $T$
    V:              if $T = T_x$ for some $1 \leq x \leq N$ then $i \leftarrow x$
                    else output "unknown tag" and halt
    V:              $(j, \{P_i(1), P_i(2), ..., P_i(q)\}) \leftarrow$ GeneratePINSet$(i)[q]$;
    V → R:          $\{P_i(n)\}_{n=1}^{q}$;

for $n = 1$ to $q$ do
    R → T:              PIN-test$(P_i^{(n)})$
    T → R:              $R^{(n)}$ R → V:          $\{R^{(n)}\}_{n=1}^{q}$;
    V:              $M \leftarrow$ "valid";
                    for $n = 1$ to $q$ do
                        if $R^{(n)} = $ '1' and $n \neq j$ then $M \leftarrow$ "invalid";
                        if $R^{(n)} = $ '0' and $n = j$ then $M \leftarrow$ "invalid"
                    output $M$
```

METHODS AND APPARATUS FOR RFID DEVICE AUTHENTICATION

RELATED APPLICATION(S)

The present application claims the priority of U.S. Provisional Patent Application Ser. No. 60/660,771, filed Mar. 11, 2005 and entitled "Strengthening EPC Tags Against Cloning," and U.S. Provisional Patent Application Ser. No. 60/591,982, filed Jul. 29, 2004 and entitled "Strengthening EPC Tags Against Cloning," the disclosures of which are incorporated by reference herein.

The present application is also related to U.S. patent application Ser. No. 10/782,309, filed Feb. 19, 2004 and entitled "Low-Complexity Cryptographic Techniques For Use With Radio Frequency Identification Devices," which issued as U.S. Pat. No. 7,532,104 on May 12, 2009; U.S. patent application Ser. No. 10/673,540, filed Sep. 29, 2003 and entitled "Method And Apparatus For Selective Blocking Of Radio Frequency Identification Devices," which issued as U.S. Pat. No. 6,970,070 on Nov. 29, 2005; and U.S. patent application Ser. No. 10/915,189, filed Aug. 10, 2004 and entitled "Radio Frequency Identification System With Privacy Policy Implementation Based On Device Classification," which issued as U.S. Pat. No. 7,298,243 on Nov. 20, 2007; which are commonly assigned herewith and incorporated by reference herein.

FIELD OF THE INVENTION

The present invention relates generally to radio frequency identification (RFID) tags or other types of RFID devices, and more particularly to techniques for authentication of such devices so as to prevent tag counterfeiting or other types of cloning attacks.

BACKGROUND OF THE INVENTION

A conventional RFID tag typically comprises an integrated circuit transceiver capable of transmitting a unique serial number or other identifying information to a nearby reader in response to a query from the reader. Many RFID tags are "passive" in that they do not include a battery or other power source, but instead obtain the power necessary to operate from the query signal itself.

Ongoing RFID tag development efforts have led to significant cost and size reductions, which should result in a rapid proliferation of RFID tags into many new areas of use. For example, RFID tags are expected to replace printed barcodes in consumer product applications. The Electronic Product Code (EPC) tag is a form of RFID device that is emerging as a successor to the printed barcode. EPC tags are an evolving standard under development by an organization called EPCglobal, a joint venture between the UCC and EAN, the organizations that oversee barcode standards in the U.S. and Europe, respectively. An EPC is the form of identifier that an individual EPC tag emits as prescribed by the EPCglobal standard. An EPC includes not just the information contained in a conventional printed barcode, namely the manufacturer and type of a particular product, but also a unique serial number. Additional details can be found in the current version of the EPCglobal standard document, "EPC™ Radio-Frequency Identity Protocols Class-1 Generation-2 UHF RFID Protocol for Communications at 860 MHz-960 MHz," Version 1.0.8, 2005.

The unique serial number of an EPC tag associated with an object can serve as a pointer to a database entry containing a detailed history of the object. Thanks to the features of automated scanning and unique identification, RFID systems promise fine-grained tracking of inventory on an unprecedented scale.

Some commercial segments, like the pharmaceutical industry, are coming to view EPC tags as an anti-counterfeiting tool. EPC tags are a potent mechanism for object identification, and can facilitate the compilation of detailed object histories and pedigrees. They are poor authenticators, though, as they possess no explicit authentication functionality. The EPCglobal standards prescribe no mechanism for EPC readers to authenticate the validity of the tags they scan. An EPC tag emits its EPC promiscuously, i.e., to any querying reader. Readers accept the validity of the EPCs they scan at face value. Thus, EPC tags are vulnerable to counterfeiting or other types of cloning attacks.

An attacker can learn an EPC tag's essential data, its EPC, simply by scanning it or by gaining access to an appropriate tag database. The term "skimming" is used herein to denote the process of scanning an EPC tag to obtain its EPC for the purpose of cloning the tag. Furthermore, if the unique identifiers in a manufacturer's EPCs are not random, e.g., if they are sequential, then an attacker that sees an EPC on one item can guess or fabricate another valid EPC. In brief, "identity theft" of EPC tags is a straightforward matter because EPCs are data objects that are easily separable from EPC tags.

Some commercially available RFID tags can perform cryptographic challenge-response protocols. Such tags offer resistance to cloning attacks involving skimming. They typically cost significantly more than EPC tags, though, and may therefore be practical only for certain niche applications.

Privacy-protecting authentication protocols for RFID tags are described in S. E. Sarma et al., "Radio-frequency-identification security risks and challenges," RSA Laboratories, CryptoBytes, 6(1), 2003, and S. A. Weis et al., "Security and privacy aspects of low-cost radio frequency identification systems," First International Conference on Security in Pervasive Computing, 2003. However, these protocols utilize cryptographic hash functions, and thus may be unsuitable for Class-1 EPC tags.

The above-cited U.S. patent application Ser. No. 10/782,309 discloses an authentication approach referred to as "minimalist" cryptography, including a security model for RFID environments that permits a form of dynamic challenge-response protocol without the use of complex cryptographic operations. However, even this minimalist approach may require greater tag resources than are available in the current generation of EPC tags.

Another approach, known as "yoking," allows a pair of tags with minimal resources to construct a one-time proof that they have been read simultaneously. See A. Juels, "'Yoking-proofs' for RFID tags," PerCom Workshops 2004, pp. 138-143, IEEE Computer Society, 2004. The techniques underlying yoking could be used to enable tags to authenticate themselves to readers, but aim to secure only one-time use, rather than repeated use.

There is a considerable body of research on the design of lightweight public-key encryption and digital-signing algorithms, largely intended for use in smart cards and similarly small computational devices. See, e.g., J. Stern et al., "Cryptanalysis of the OTM signature scheme from FC '02," R. Wright, editor, Financial Cryptography '03, pp. 138-148, Springer-Verlag, 2003, LNCS No. 2742. However, even the most lightweight of these many schemes is likely to be well beyond the capabilities of small RFID tags for quite some time to come. A related area is security for sensor networks. While lightweight, these devices are still more capable than RFID tags, as they typically include their own power sources. Although recent work has led to more compact implementations of symmetric-key primitives like AES for RFID tags, these are still well beyond the reach of Class-1 EPC tags today, and unsupported in the EPCglobal standard.

Accordingly, a need exists for techniques for authenticating EPC tags and other types of RFID devices, so as to prevent counterfeiting or other cloning attacks without requiring cryptographic operations.

SUMMARY OF THE INVENTION

The present invention in accordance with one aspect thereof provides techniques for authenticating EPC tags or other RFID devices in an RFID system. The RFID system generally includes a plurality of RFID devices and at least one reader which communicates with one or more of the devices.

In an aspect of the invention, an identifier transmitted by a given one of the RFID devices is received by a reader, or by a separate verifier via the reader. At least first and second codes are determined by the reader or verifier, with the first code being a valid code for the identifier, and the second code being an invalid code for the identifier. These codes are communicated to the given RFID device by the reader, or by the verifier via the reader. Return communications are processed by the reader or verifier to determine if the RFID device is able to confirm that the first code is a valid code and the second code is an invalid code. If the RFID device can so confirm, it has been authenticated.

In an illustrative embodiment, the identifier comprises an EPC, and the given RFID device comprises an EPC tag, with the first code comprising a valid kill code of the EPC tag, and the second code comprising a spurious or invalid kill code of the EPC tag.

The first and second codes may be part of a set of q codes comprising q−1 invalid codes and a single valid code with the valid code being inserted in a particular position in the set. For each of the codes in the set, the code is transmitted to the given RFID device, and a corresponding response is processed to determine whether or not the given RFID device considers the particular code to be valid. The set of q codes may comprise a set $\{P_i^{(n)}\}_{n=1}^q$ selected uniformly at random without duplication from $\{0, 1\}^k$ with the valid code comprising a code $K_i$ which replaces a random element $P_i^{(j)}$ for $j \in_U \{1, 2, \ldots, q\}$. As one possible alternative, the set of q codes may be generated pseudorandomly, utilizing a one-way hash function and a master key.

In embodiments in which the codes are generated and processed in a verifier which is separate from the reader, of the reader and the verifier only the verifier may be aware of which of the codes is the valid code for the identifier. For example, the q codes may be supplied to the reader by the separate verifier, with the reader being unaware as to which of the q codes is the valid code. Such arrangements protect the system against compromised or otherwise untrusted readers.

In another aspect of the invention, the codes may be supplied to the reader by the verifier only upon fulfillment by the reader of at least one specified condition. For example, the codes may be supplied by the verifier to the reader only if the reader can demonstrate to the verifier that the reader is in communication with the given RFID device.

In yet another aspect of the invention, an identifier transmitted by a given one of the RFID devices is received by a reader, or by a separate verifier via the reader, and a code corresponding to the identifier is determined. The code is utilizable to initiate a control function of the given RFID device, and may be a valid kill code of the given RFID device. The code is transmitted to the given RFID device, by the reader or by the verifier via the reader, and the given RFID device is designated as an unauthenticated device if it fails to provide an expected response to transmission of the code.

In a further aspect of the invention, an identifier transmitted by a given one of the RFID devices is received by a reader, or by a separate verifier via the reader. A first code is transmitted to the given RFID device, by the reader or by the verifier via the reader. A second code is received from the RFID device responsive to transmission of the first code to the given RFID device, again by the reader or by the verifier via the reader. A determination is made by the reader or verifier as to whether the second code is a valid code for the given RFID device. If it is, the RFID device has been authenticated. In an illustrative embodiment of such an arrangement, in which the given RFID device comprises an EPC tag, the first code may comprise a valid access code of the EPC tag, and the second code may comprise a valid kill code of the EPC tag. As another example, the second code may comprise a particular one of a plurality of portions of a valid kill code of the EPC tag.

Yet another aspect of the invention relates to an EPC tag or other RFID device for use in an RFID system comprising a plurality of RFID devices and at least one reader which communicates with one or more of the devices. The RFID device is configured to transmit an identifier to the reader, to receive from the reader at least first and second codes, wherein the first code is a valid code for the identifier, and the second code is an invalid code for the identifier, and to transmit information to the reader indicating confirmation that the first code is a valid code and the second code is an invalid code.

Advantageously, the present invention in the illustrative embodiments provides simple and efficient techniques for authenticating EPC tags or other RFID devices, in a manner that utilizes kill, access or other code functionality within the RFID devices to prevent certain important cloning attacks without the need for cryptographic operations.

These and other features and advantages of the present invention will become more readily apparent from the accompanying drawings and the following detailed description.

BRIEF DESCRIPTION OF THE DRAWINGS

FIGS. 3, 4, 5 and 6 show exemplary protocols for providing RFID device authentication in the FIG. 1 system in illustrative embodiments of the invention.

DETAILED DESCRIPTION

The present invention will be described herein with reference to an exemplary RFID system in which multiple RFID devices communicate with an RFID device reader. It is to be appreciated, however, that the invention is not restricted to use in this or any other particular RFID system configuration.

The term "RFID device" as used herein is intended to include an RFID tag or any other type of device configurable for transmission of device-identifying information via radio frequency communications. Although the following description will refer primarily to EPC tags, it is to be understood that the techniques disclosed are applicable to other types of RFID tags, and more generally applicable to other types of RFID devices. Also, the terms "radio frequency" or "RF" as used herein are not intended to be restricted to any particular frequency range, but are instead intended to be construed more generally so as to encompass any contiguous or non-contiguous arrangement of one or more signal frequencies suitable for supporting wireless communication between at least one device and at least one reader.

As described in the above-cited U.S. patent application Ser. No. 10/915,189, a given RFID device in an illustrative embodiment of the invention may have one or more of a number of different classifications. For example, the given RFID device may be classified as one of public, private, blocker, unblocker, etc. The classification of the given RFID device may be dynamic, that is, it can vary over time. Also, it is possible for a given RFID device to have multiple classifications at the same time, depending upon the particular set of classifications in use. The present invention, however, does not require the use of these or any other RFID device classification techniques.

The device-identifying information associated with a given RFID device may be an EPC, a serial number or any other type of identifier. It should be noted that not every identifier in a given set of unique identifiers need have a corresponding realized device.

The term "identifier" as used herein is intended to include a pseudonym of the type described in the above-cited U.S. patent application Ser. No. 10/782,309. In addition, an identifier is intended to include any information suitable for providing an indication of a classification of a particular RFID device.

The term "reader" as used herein is intended to include any type of device capable of interacting with an RFID tag or other device so as to receive device-identifying information therefrom.

1. Example of an RFID System

Figure 1:
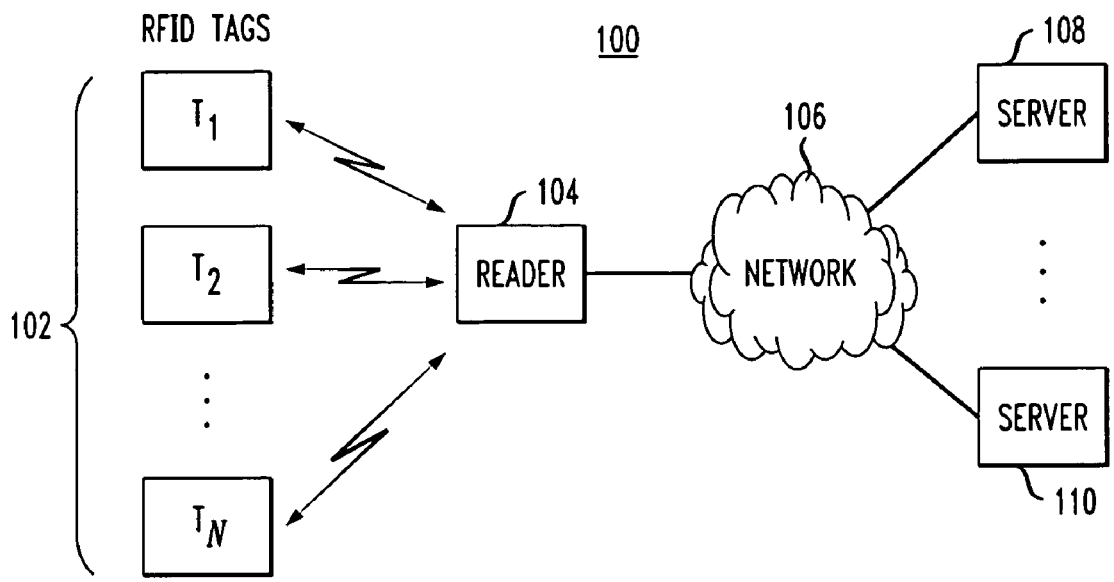
FIG. 1 is a simplified block diagram of an exemplary RFID system in which the present invention is implemented in one embodiment.

FIG. 1 shows an RFID system 100 in which the present invention is implemented. The system 100 includes a number N of RFID tags 102, more particularly denoted by their associated tag identifiers $T_1, T_2, \ldots T_N$, and an RFID reader 104. The reader 104 communicates with the tags 102 and receives identifying information therefrom, in the form of one or more transmitted identifiers. The reader 104 is coupled via a network 106 to servers denoted 108, 110.

A given RFID tag 102 in accordance with the invention generally includes circuitry comprising memory, processing logic and an RF transceiver. These elements may be configured in a manner similar to that used in conventional RFID tags.

One or more of the tags 102 may each comprise a so-called "blocker tag" configured with an ability to block the operation of a singulation algorithm utilized by the reader 104 in order to provide enhanced privacy for a user of the tag, as described in the above-cited U.S. patent application Ser. No. 10/673,540. The present invention, however, does not require the use of such blocker tags.

One or more of the tags 102 may also or alternatively implement minimalist cryptography, soft blocking, or other techniques described in the above-cited U.S. patent application Ser. Nos. 10/782,309 and 10/915,189. Again, the present invention does not require the use of such techniques.

The network 106 may represent a global computer network such as the Internet, a wide area network (WAN), a local area network (LAN), a satellite network, a telephone or cable network, or various portions or combinations of these and other types of networks. The servers 108, 110 may be conventional processor-based information processing devices of a type conventionally utilized in conjunction with RFID readers in an RFID system.

The particular number N of tags 102 in the system 100 is purely arbitrary, and the system can be configured to support any desired number of tags. Also, although only a single reader 104 is shown in the figure for simplicity and clarity of illustration, the system will typically include multiple readers. Furthermore, it should be noted that a given reader need not be connected to a network, and may instead operate as a stand-alone device, or may be only intermittently connected to the network. Also, a given reader can be directly connected to a server or other system element, rather than connected thereto over a network as illustrated in the example system 100.

Figure 2:
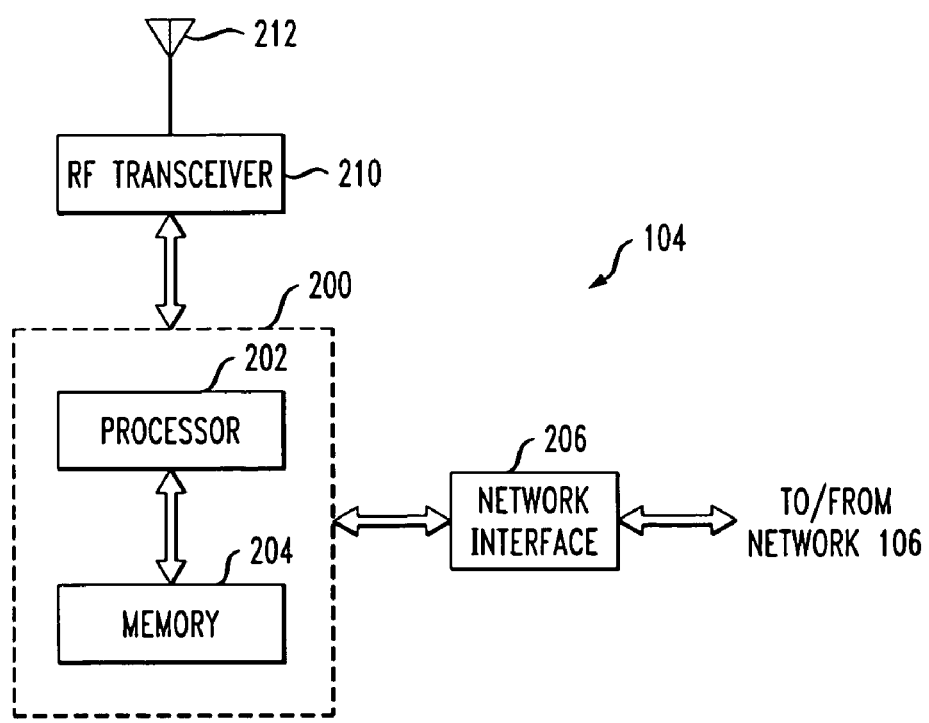
FIG. 2 illustrates one possible implementation of an RFID device reader of the FIG. 1 system.

FIG. 2 shows one possible implementation of the reader 104 of the FIG. 1 system. The reader in this implementation includes a processing block 200, comprising a processor 202 coupled to a memory 204, a network interface 206, an RF transceiver 210, and an antenna 212. One or more of these elements may be implemented in whole or in part as a conventional microprocessor, digital signal processor, application-specific integrated circuit (ASIC) or other type of circuitry, as well as portions or combinations of such circuitry elements. Software programs for controlling the operation of the reader 104 may be stored in the memory 204 and executed by the processor 202.

A typical RFID reader is generally only able to communicate with a single RFID tag at a time. In effect, however, the reader may be viewed as broadcasting a query to all of the tags 102 at once. If more than one tag responds to a query by the reader, the reader detects a collision and executes a singulation algorithm which allows the reader to communicate with the conflicting tags one at a time.

Conventional RFID tag systems may operate at a frequency of, for example, either 13.56 MHz or 915 MHz, and may utilize, for example, ALOHA-type singulation algorithms or tree-walking singulation algorithms. Other frequencies, such as 125 kHz and 2.45 GHz, are also used, and employ similar singulation algorithms. Such singulation algorithms are known in the art, and will therefore not be further described herein. The invention can be utilized with a reader incorporating one of these known singulation algorithms, or a reader incorporating another type of singulation algorithm, or any other type of reader, including a reader that does not singulate tags. Thus, it is to be appreciated that the invention does not require the use of singulation.

The present invention in the illustrative embodiments provides techniques for RFID device authentication. Advantageously, these techniques can be implemented without the use of cryptographic operations, and in a system which comprises EPCglobal Class-1 Generation-2 UHF tags or other types of EPC tags. Of course, the techniques described herein can be readily applied to other types of RFID devices.

An RFID device authentication technique of the present invention may be implemented, by way of example, in a system in which RFID tags or RFID readers are implemented in mobile telephones, portable computers or other similar devices. More generally, such RFID device or RFID reader elements may be implemented in or otherwise comprise at least a portion of a mobile telephone, a portable computer, a personal digital assistant (PDA), a hardware-based authentication token such as an RSA SecurID® token commercially available from RSA Security Inc. of Bedford, Mass., U.S.A., or any other type of processing device utilizable in implementing RFID device authentication functionality as described herein. The invention thus does not require any particular RFID device or reader configuration.

In the illustrative embodiments, RFID device authentication is implemented in the FIG. 1 system using a number of exemplary protocols which will be described below in conjunction with the protocol diagrams of FIGS. 3 through 6.

2. EPC Tag Capabilities

It will initially be assumed without limitation that the tags 102 of the FIG. 1 system comprise EPCglobal Class-1 Generation-2 UHF tags, which are likely to predominate in supply chains. The illustrative embodiments leverage code-based access-control and privacy enhancement mechanisms in EPC tags to achieve a type of challenge-response authentication. These techniques can even strengthen EPC tags against cloning in environments with untrusted readers. It is to be appreciated, however, that the described techniques can be adapted in a straightforward manner to use with a wide variety of other types of RFID tags, or more generally, RFID devices.

As noted above, as supply chains expand and automation becomes commonplace, users are likely to come to rely implicitly on RFID tags to authenticate goods. Protecting EPC tags against cloning, however, is challenging, as they possess no explicit authentication functionality. EPC tags do possess features geared toward privacy protection and access control, provided using respective kill and access "personal identification numbers" or PINs, which are examples of what are more generally referred to herein as "codes." In the illustrative embodiments, these features are leveraged to construct rudimentary tag-to-reader authentication protocols. These protocols also facilitate the implementation of another inventive technique, referred to herein as fulfillment-conditional PIN distribution (FCPD), which prevents en bloc theft of tag PINs by compromised readers.

Throughout this description, we make a distinction between EPC tags and EPCs. An EPC tag is a physical RFID device, while an EPC is the digital information belonging to and generally contained in a particular tag. An EPC is a just a piece of data, and thus separable from an EPC tag.

While EPC tags carry no explicit mechanisms for authentication, as we have explained, they do possess some basic data-security features. We briefly describe them here. We distinguish between two types of tags. A basic EPC tag is one that carries only the mandatory features of the EPCglobal standard. An enhanced EPC tag additionally includes an access-control function that is optional in the EPCglobal standard.

The capabilities of basic and enhanced EPC tags will be addressed in separate subsections below.

2.1 Basic EPC Tags

Basic EPC tags have only one security feature that we exploit here, namely a privacy-enhancing kill command. When an EPC tag receives this command, it "self-destructs," which is to say that it renders itself completely and permanently inoperable. To protect against accidental or malicious killing of tags, the kill command only takes effect when accompanied by a valid PIN. In the EPCglobal standard, the kill PIN is 32 bits in length.

Tag killing may be viewed as an access-control operation that succeeds only once. The EPCglobal standard, though, has a feature that can serve in principle to permit multiple presentations of a valid kill PIN. Recall that an EPC tag is passive, meaning that it receives its power from a reader. When it receives a kill command and valid PIN, but has insufficient power to disable itself, an EPC tag remains operational, and emits an error code. When it receives a kill command with an invalid PIN, the tag effectively ignores the command.

In consequence, given the ability to cause an EPC tag to register insufficient power for the kill operation, one can cause a tag effectively to emit a "yes" or "no" indicating the validity of a kill PIN. There are at least two ways that kill-PIN verification might be consistently achievable. The first involves modification of tags, the second, modification of readers:

1. Hobbling the kill command: The EPCglobal standard does not specify a criterion, e.g., a minimum power level, for a tag to accept a kill command. Thus, a manufacturer could create an EPC-compliant tag that always registers insufficient power. In effect, such tags would possess the mandatory kill function in a degenerate form. As the kill function aims at consumer privacy protection, and EPC tags will not reach the hands of consumers in many applications for quite some time, this modification may prove acceptable in some sectors.

2. Power calibration: In principle, precise positioning of an EPC tag near a reader and precise calibration of the reader power level could cause a tag to register insufficient power for the kill command. Successful implementation of such an approach would require careful consideration of a variety of factors relating to design and configuration of the tags and other system elements.

Other techniques can be used to make kill-PIN verification achievable. For example, the tags may be redesigned to provide one or more additional conditions, based on power levels, codes or other factors, to provide a confirmation for a given tag that it should indeed be killed before it actually allows itself to be killed. Thus, tags can be designed to implement a two-level kill process, or other similar arrangement, which permits PIN verification of the type used in the illustrative embodiments, while also preserving the privacy advantages of the kill function. It is to be appreciated, however, that the invention may be implemented without any modification to existing tags.

In section 3, we propose authentication techniques that assume the ability to validate kill PINs repeatedly in basic EPC tags.

In section 5.1, we describe a situation in which the kill command is useful as a one-time authentication operation, i.e., without the need for non-standard implementation. Our aim there is to use tag authentication as a subsidiary tool to achieve the goal of preventing en bloc theft of tag PINs by compromised readers.

2.2 Enhanced EPC Tags

With regard to enhanced EPC tags, such tags respond to a command called access, whose implementation is optional in the EPCglobal standard. When accompanied by a valid 32-bit access PIN, the access command causes a tag to transition into what is called a "secured" state. Tags may be configured such that certain commands only function when a tag is "secured." In particular, read access to the memory banks for the access and kill PINs may be made dependent on an EPC tag being "secured." The standard supports no PINs other than the access and kill PINs.

In consequence, although the EPC of a tag may be readily skimmed, a properly configured EPC tag does not promiscuously emit its PINs. Thus the PINs are resistant to skimming. We show how to exploit this feature to achieve a type of challenge-response protocol.

Another useful feature supported by the EPCglobal standard is the word-level granularity of read and write operations. In particular, it is possible to read or write the upper or lower half of a PIN exclusively.

3. Authenticating Basic EPC Tags

We now describe illustrative protocols to help defend basic EPC tags against skimming attacks. Recall that we assume, as explained above, that the kill command may serve repeatedly to check the correctness of a kill PIN presented by a reader.

We shall exploit this PIN-based reader-to-tag authentication feature in the kill operation, utilizing it to construct tag-to-reader authentication protocols. For clarity of notation, let us denote by PIN-test (K) an EPC-tag command that causes a tag to output a bit-response b. The value of b is a '0' if K is the correct kill PIN for the tag and '1' otherwise.

In a system with N tags, such as system 100 of FIG. 1, let the integer i (with $1 \leq i \leq N$) denote the unique index of an EPC tag. Let us denote the EPC identifier, i.e., the unique RFID readable string for tag i, by $T_i$. Let $K_i$ denote the currently valid kill PIN for the tag having identifier $T_i$. We assume that $K_i$ is generated uniformly at random, and held as a shared secret between the tag and a trusted reader.

We begin by presenting an elementary protocol SimpleTagAuth in FIG. 3. In this and following figures, "A→B:" indicates a data flow from entity A to entity B, while "A:" indicates an operation performed locally by A. In the protocol SimpleTagAuth, presented in FIG. 3, a trusted reader R attempts to authenticate a tag T.

A tag that does not carry a valid identifier $T_x$ for some x (or at least one known to the reader) will not achieve successful authentication in this protocol. Thus an adversary cannot successfully clone a tag without knowledge of a valid $T_x$ obtained, for example, via skimming.

On the other hand, consider a clone ĩ that is EPC-compliant but created via a simple skimming attack. Such an EPC-compliant clone ĩ might be easily created, for instance, through configuration of a field-programmable EPC tag. Obviously, skimming reveals the EPC of a tag, but not the secret $K_i$. For ĩ to cause a "valid" output, therefore, its creator would need to guess $K_i$ correctly. For an l-bit PIN, the probability of successful cloning is therefore just $2^{-l}$. As a kill PIN in Class-1 Generation-2 tags is 32-bits long, the probability of successful cloning of a single, given EPC tag is therefore less than one-in-a-billion.

When performing active attacks against a tag i, an adversary can of course actively test multiple possible values of $K_i$. With 32-bit PINs, though, this form of active attack is largely impractical. Some EPC tags currently defend against PIN-guessing by temporarily disabling a tag when multiple incorrect PINs are presented. See, e.g., "RFID, privacy, and corporate data," RFID Journal, 2 Jun. 2003. However, these tags generally have short PINs, e.g., 8 bits in length. It is unclear whether manufacturers of tags with 32-bit PINs will adopt this approach, or whether it is even necessary.

3.1 Non-Compliant Clones

The SimpleTagAuth protocol of FIG. 3 has a basic vulnerability: If the cloned tag ĩ is not EPC-compliant, then it can spoof the reader. It suffices for ĩ simply to accept any PIN, in which case the protocol will always output "valid."

To detect non-compliant clones of this kind, we propose the introduction of spurious PINs into the FIG. 3 protocol. In this approach, the reader tests the response of a tag to some randomly presented PINs that are not valid. If the PIN-test operation yields a '1' in response to any of these PINs, then the reader can identify it as counterfeit. We include these ideas in a protocol that we call BasicTagAuth, shown in FIG. 4.

Here the value q is a security parameter that specifies the number of spurious PINs to be generated. The function GeneratePINSet generates a set of q−1 spurious PINs uniformly at random (without duplication). Among these is randomly inserted the one correct kill PIN $K_i$ in a random position j, which is also output by the function GeneratePINSet. We detail the exact operation of GeneratePINSet at the end of this section.

For an attacker that performs skimming attacks only, the best strategy to defeat the protocol BasicTagAuth is to create a clone device that attempts to guess the correct PIN-trial j uniformly at random (or contains a pre-programmed guess). Note that the main protocol loop is not halted on determination of tag validity. While continuation is not strictly necessary, our aim is to emphasize the value of concealing timing information that can shed light on the validity of a given tag or a given PIN. The probability of successful attack in this case, i.e., of the cloned tag appearing to be valid, is clearly just 1/q.

BasicTagAuth is naturally time-consuming for large values of q. To prevent more than casual introduction of counterfeit tags into an RFID system, however, it would suffice to detect such tags with significant but not overwhelming probability. For this purpose, even q=2, i.e., a single spurious PIN, would generally be adequate. Moreover, it is possible to implement this protocol, or any of the other protocols of the illustrative embodiments, on a periodic or probabilistic basis, i.e., to test the authenticity of just a fraction of tags.

An adversary that performs eavesdropping on the authentication protocol itself, of course, can defeat it completely, as can an adversary that performs the following three-step attack: (1) The adversary skims a tag or otherwise obtains $T_i$; (2) The adversary interacts with a valid reader and obtains the PIN set $\{P_i^{(j)}\}_{j=1}^q$; (3) The adversary actively tests values in the PIN set $\{P_i^{(j)}\}_{j=1}^q$ on tag i.

There are at least two ways that the function GeneratePINSet can generate spurious PINs. One method is random selection. In particular, the set $\{P_i^{(n)}\}_{n=1}^q$ may be selected uniformly at random without duplication from $\{0,1\}^k$. The true PIN $K_i$ should then replace a random element $P_i^{(j)}$ for $j \in_U \{1, 2, \ldots, q\}$.

In this example, the PIN set $\{P_i^{(n)}\}$ must remain static over all invocations of BasicTagAuth. This is important in that if the set of spurious PINs were to change from session to session, then an adversary could determine $P_i$ by computing the intersection between or among PIN sets. Thus, if already invoked for tag i, the function GeneratePINSet should simply output the existing set $\{P_i^{(n)}\}_{n=1}^q$.

As a second approach to spurious-PIN generation, it is possible to avoid the need for storing the set $\{P_i^{(n)}\}_{n=1}^q$ by generating it pseudorandomly. To use informal notation here, let f denote a one-way hash function, and x denote a master secret-key held by the reader R. For a positive integer z and non-empty set $S=\{q_0, q_1, \ldots, q_{|S|-1}\}$, let $S_{[z]}$ denote the element $q_{z \bmod |S|}$. GeneratePINSet may be constructed as follows:

GeneratePINSet(i)[q]
$Q \leftarrow K_i$;
for n=1 to q do
    $P_i^{(n)} \leftarrow \{\{0,1\}^k - Q\}_{[f(x,i,n)]}$;
    $Q \leftarrow Q \cup \{P_i^{(n)}\}$;
$j \leftarrow \{1, 2, \ldots, q\}_{[f(x,i,q+1)]}$;
$P_i^{(j)} \leftarrow K_i$;
output $(j, \{P_i^{(n)}\}_{n=1}^q)$;

Of course, there are many alternative approaches to generating PIN sets, e.g., selecting $P_i^{(n)}$ uniformly from $\{0,1\}^k$ and rejecting it if it is in Q, or even retaining duplicates at the cost of a small degradation in security.

4. Authenticating Enhanced EPC Tags

As we have explained, enhanced EPC tags permit configuration such that a reader must transmit the access PIN to a tag in order to read its resident kill PIN. This opens up the possibility of using the kill PIN for an unintended purpose, as a secret permitting tag authentication. In another illustrative embodiment, tags are authenticated using a fixed-value mutual-authentication protocol, in which the access PIN serves to authenticate the reader, and the kill PIN in turn serves to authenticate the tag.

FIG. 5 shows an example of such a protocol, also referred to herein as EnhancedTagAuth. Let $A_i$ denote the access PIN for tag i. An adversary that has skimmed tag i and attempts to simulate it in the EnhancedTagAuth protocol can create a counterfeit device that implicitly accepts the access PIN and then guesses the kill PIN. This will succeed with probability $2^{-l}$, where l is the bit-length of the kill PIN, just as in the SimpleTagAuth protocol of FIG. 3. Thus, an enhanced EPC tag will resist a single invocation of this attack with probability more than one-in-a-billion. This is significantly better than the security achievable through BasicTagAuth with any practical value of q. On the other hand, the EnhancedTagAuth protocol is still vulnerable to eavesdropping and to the three-step active attack outlined above for BasicTagAuth.

As we noted above, EPC tags support partial reads and writes. PINs are two words long; read and write operations may address just a single word. Thus, it is possible to combat passive eavesdropping attacks to a very limited extent by treating the 32-bit kill PIN as two 16-bit secrets $K_{i,1}$ and $K_{i,2}$. For example, readers within one security zone might verify the correctness of $K_{i,1}$, while those in a second security zone check $K_{i,2}$. In the language of the FIG. 5 protocol, $K \leftarrow K_{i,z}$ in security zone $z \in 1,2$. Passive eavesdropping within one perimeter, then, would not permit tag cloning in the other.

Finally, we observe that the BasicTagAuth protocol can be used for enhanced EPC tags in the case where the reader has access to only an access PIN or kill PIN for a given tag, or where the tag itself has only one programmed PIN.

5. Untrusted Readers

A working assumption in the description of the illustrative protocols thus far has been that readers are trustworthy verifiers. More specifically, we have assumed that the reader R may be entrusted a priori with the PINs for a given tag. This assumption may not always be architecturally desirable, though.

We may wish instead to consider that a trusted verifier entity V with knowledge of $P_i$ is not identical with the reader R participating in the protocol. The verifier V might instead be a secure, centralized server that interacts with one or more readers. For example, V may be a given one of the servers 108, 110 in the system 100 of FIG. 1, or other type of trusted system entity. We may then view the authenticating entity in our protocol as a combination of R and an allegedly valid EPC tag: The reader R tries to prove to V that it is scanning a particular tag i. This view yields a new protocol variant with entities V, R, and presumed tag T.

FIG. 6 shows a modification of the protocol BasicTagAuth of FIG. 4 to achieve this scenario with untrusted readers. The modified protocol is referred to as BasicTagAuth$^+$.

In this modified protocol, the reader may be viewed simply as an untrusted communications medium by which the tag communicates with V. Without access to tag i, the reader R itself does not learn which of the presented PINs is the correct one. Hence the security properties of this protocol with respect to an attacker that has compromised R and knows $T_i$ alone are similar to those for BasicTagAuth with respect to an attacker that only knows $T_i$. In brief, with knowledge of $T_i$ alone, the best an attacker can do in creating a clone is to guess the correct PIN uniformly at random from a set of q PINs. Thus, the attacker can only successfully clone a tag with probability 1/q. On the other hand, once it scans tag i, of course, the reader R (and attacker that has compromised the reader) does learn $K_i$.

The protocol variant BasicTagAuth$^+$ is particularly interesting because readers represent a salient point of compromise in RFID systems. In a naïve deployment, a reader might be capable of accessing a PIN $K_i$ (from a database, for instance) for any tag identifier $T_i$. In such a system, compromise of a single reader would result in massive compromise of tag PINs. An attacker with access to the compromised reader would be able to learn the PIN $K_i$ associated with any tag identifier $T_i$ and then clone the tag perfectly.

This situation is particularly problematic because RFID readers will inevitably become ubiquitous peripherals. They will populate warehouses, storage rooms, trucks, and retail environments. In many RFID architectures readers may be given unfettered access to backend systems in order to query for PINs. Use of the protocol BasicTagAuth$^+$ can help address the problems associated with reader compromise, by limiting access on the part of misbehaving readers.

In some architectures where network failures are a concern, readers or associated devices might store large numbers of tag PINs locally. The protocol BasicTagAuth$^+$ can offer stronger security even in this environment. Rather than storing PINs locally, readers can instead store the kill PIN sets generated by GeneratePINSet. Compromise of the reader would no longer then lead to direct compromise of true tag PINs and the ability to clone skimmed tags.

A drawback to the BasicTagAuth$^+$ approach is that to execute sensitive tag operations, a reader would have to try multiple PINs, i.e., cycle through the stored PIN set for a tag. However, with q=2, i.e., a single spurious PIN per tag, we believe an RFID system could offer reasonably strong defense against general tag cloning, with minimal impact on performance.

In systems where tag identifiers are sparse and hard to predict, we note that a reader might effectively demonstrate radio contact with a tag merely by submitting its identifier $T_i$.

Achieving authentication of enhanced EPC tags with untrusted readers is a simpler exercise than for basic EPC tags. For enhanced EPC tags, it is not necessary to store kill PINs on readers, but instead sufficient to have a reader transmit a kill PIN to V for verification. Of course, if kill PINs are also being used for killing, then readers may need more general access to these PINs. In that case, it is possible to take more or less the same approach as with BasicTagAuth$^+$: Readers do not store correct kill PINs alone, but rather the sets generated by GeneratePINSet.

Spurious PINs themselves might be used to trace the origin of counterfeiting attempts. For example, suppose ï that a counterfeit tag is encountered in the field with an invalid PIN $\ddot{K}_i$ that corresponds to one of the spurious PINs for tag i. In this case, we might flag ï as likely to have been fabricated using information from a compromised reader. It is even possible to customize spurious PINs not just for particular tags, but for particular readers or sets of readers. A counterfeit tag emitting a spurious PIN would then provide information on which reader or set of readers leaked the data used in its fabrication. This latter approach, however, would need careful deployment, as intersection among spurious PIN sets leaks information about which PIN is the valid one. Thus, some degree of overlap among sets would be desirable.

While spurious PINs help prevent cloning in the illustrative protocols described above, they do not defend against certain attacks made directly on legitimate tags. For example, if an attacker wishes to kill a tag, and has a small set of candidate kill PINs for the tag, the attacker can simply try all of the PINs exhaustively. Executing BasicTagAuth$^+$ on untrusted readers can indeed exacerbate such problems. Of course, this is not an issue when the kill operation is hobbled as we propose above.

5.1 Preventing en bloc PIN Theft: Fulfillment-Conditional PIN Distribution (FCPD)

We have considered techniques by which untrusted readers may be used to authenticate tags. The techniques we have introduced here, though, may serve a different and somewhat unrelated security goal, namely the prevention of en bloc theft of PINs by compromised readers. We propose an approach that we call fulfillment-conditional PIN distribution, and abbreviate FCPD.

We observe that the BasicTagAuth+ protocol of FIG. 6 does not merely verify the authenticity of a tag T; it verifies that a reader R actually has physical access to T. The idea behind fulfillment-conditional PIN distribution is thus as follows. We ensure that a reader may only download PINs for a particular set of tags if it is entitled to do so by merit of its physically accessing the tags. Viewed another way, we furnish PINs to a reader only if it can prove that it is using them successfully.

Let us assume that a reader R (being a computationally high-powered device) is capable of strong authentication to a central authority V. The idea is for V to honor PIN requests by R. V executes BasicTagAuth+ with R periodically. If R provides valid answers, then V continues to satisfy PIN requests. If not, then V concludes that R is not successfully making use of the PINs it receives. This implies that either (1) R is scanning forged tags or (2) R is not scanning the tags for which it is requesting PINs.

An important observation is that FCPD works even when PIN-test is just a one-time operation, e.g., a conventionally executed kill operation. Since the aim is to ensure proper behavior by R, and not the authenticity of tags themselves, multiple successful tests of PIN validity for a given tag, e.g., multiple tag kills, are unnecessary. Also, FCPD, like the illustrative authentication protocols, may be effective even when executed for just a fraction of tags, e.g., probabilistically.

There are other possible approaches to preventing en bloc theft of PINs by compromised readers. For example, V may simply meter the rate at which R receives PINs. If this rate exceeds a certain threshold, V may either refuse to transmit further PINs for some period of time or may flag R as compromised. For example, if R is a reader at a retail point of sale, then V might limit the number of PIN requests by R to, say, 10,000 per hour.

FCPD, though, has a couple of advantages over metering:

1. Detection efficiency: FCPD can efficiently detect reader compromise after just a small number of requests. When based, for example, on BasicTagAuth+ with q=2, FCPD can detect rogue downloading of mere tens of PINs with overwhelming probability. Metering does not permit this level of sensitivity. In fact, an attacker can easily evade detection in the metering approach by downloading PINs at a fractionally lower rate than the detection threshold. FCPD, on the other hand, detects attacks probabilistically, and thus renders evasion of detection more difficult.

2. Calibration: Metering requires careful calibration of the detection threshold. If set too low, false positives will result; set too high, and false negatives will result. FCPD requires less delicate calibration. False positives, for example, should not occur in a system where tags function properly, while the false negative rate may be set quite low with little sacrifice of efficiency.

Of course, an attacker that uses a compromised reader to access tags directly, e.g., to kill them, can defeat the FCPD approach. FCPD, however, at least constrains an attacker to using PINs immediately in order to exploit them. It may therefore be desirable to strengthen FCPD with complementary countermeasures, including metering and detection of kill-command or access-command emissions in inappropriate physical locations, e.g., near store shelves.

6. Stronger Attacks

Skimming is perhaps the easiest and most practical cloning attack and therefore the most important to defend against. Stronger attacks, however, would defeat the illustrative protocols described above, as in the following examples.

1. Database breaches: An adversary capable of breaching a database containing the PINs of tags will of course be able to clone a tag perfectly. In a naïvely architected system, compromise of a valid reader could potentially have the effect of giving an adversary access to this database.

2. Reverse engineering: EPC tags are simple devices that provide no real tamper resistance. A moderately sophisticated adversary can therefore reverse-engineer a captured tag and extract its PIN. Such an adversary can of course clone the tag perfectly.

3. Active attacks: As we have noted, an adversary can extract the PINs from a target EPC tag i and clone it on performing the following three steps: (1) Obtain $T_i$; (2) Interact with a valid reader that executes one of the above-described authentication protocols; and (3) Interact with the tag i. Without more functionality in EPC tags, we believe it is not possible to defend effectively against such attacks. Thankfully, such attacks require more sophistication than skimming alone.

Man-in-the-middle attacks (in which the attacker creates a real-time "wormhole" between the target EPC tag and reader) are a general security problem for RFID systems.

A very important point to note here is that not all readers in an RFID system need be entrusted with tag-authentication capabilities. The authentication protocols we propose may be executed on just a small set of highly secured readers. By restricting counterfeit-tag detection to within a narrow perimeter, we can help mitigate system vulnerability to active attacks, and in particular the three-step attack described above.

4. Eavesdropping: As we have noted already, an adversary capable of full eavesdropping on the communications between the reader and tag can easily harvest the correct PINs for a tag. There are some important technical qualifications to consider, though.

The signal strength of the reader-to-tag channel is usually considerably stronger than that of the tag-to-reader channel. In the illustrative embodiments, the reader is an active device, while RFID tags are passive devices that receive their transmission power from the reader. An adversary can therefore more easily eavesdrop on the reader-to-tag channel. Such eavesdropping may take place at a distance of hundreds of meters, while eavesdropping on tag emissions is feasible at the very most from some tens of meters away (using off-the-shelf readers, at least).

Recognizing this asymmetry in signal strength, the EPC-global standard prescribes protocols in which tags transmit random pads (bit-strings) to readers. Readers use these pads effectively to encrypt sensitive data, namely PINs, when communicating with tags. Assuming good random-number generation on the tags, this approach renders eavesdropping feasible only on the tag-to-reader channel.

Thus, to mount a successful cloning attack against the protocols described above, an adversary would need to eavesdrop on the weaker tag-to-reader channel.

To a limited extent, periodic re-writing of EPC tag PINs can help defend against these attacks. An adversary capable of eavesdropping on only a periodic basis may not be able to learn the most up-to-date PIN employed by a given system. Likewise, an adversary that reverse-engineers a tag will be unable to seed a system with clones that remain up-to-date. There is a limitation on the regularity with which PIN changes can be viably performed, though. In general, writing to RFID tags is a more difficult operation than reading; it is less reliable, and requires greater reader proximity. Additionally, writeable memory, e.g., EEPROM, has a limited lifetime. Nonetheless, updates performed with only modest frequency could offer considerably strengthened security. See, e.g., A. Juels, "Minimalist cryptography for low-cost RFID tags," C.

Blundo and S. Cimato, editors, Security in Communication Networks (SCN 04), pp. 149-164, Springer-Verlag, 2004, LNCS No. 3352.

The present invention in the illustrative embodiments described above provides simple, practical authentication techniques that combat skimming attacks against EPC tags that are compliant with the EPC Class-1 Generation-2 UHF-RFID standard of EPCglobal, as well as other types of RFID tags or devices. The protocols of the illustrative embodiments may be viewed as involving a kind of role-reversal for the PINs in EPC tags. While these PINs are meant by design to serve for reader-to-tag authentication, we show how they may in fact provide tag-to-reader authentication and thereby help prevent skimming attacks. As we anticipate that many industry uses of EPC tags will come to rely either implicitly or explicitly on their resistance to counterfeiting, the exemplary protocols can provide particularly valuable improvements in real-world systems.

The authentication protocols of the illustrative embodiments do not defend against attacks that are substantially more sophisticated than skimming. However, significant improvements are provided within the constraints imposed by the EPCglobal Class-1 Generation-2 standard which, again, contains no explicit anti-cloning features at all. Moreover, as we have explained, by creating a more highly secure perimeter for the set of readers executing authentication protocols, through the use of a separate verifier or similar techniques, it is possible to limit vulnerability to more sophisticated attacks.

Another advantage of the authentication protocols of the illustrative embodiments is that such protocols can also be used to provide secure distribution of PINs in RFID systems, via the FCPD technique previously described, thereby addressing the problem of en bloc theft of PINs by compromised readers.

It is to be appreciated that the particular configuration, elements and operating parameters of the illustrative embodiments are not requirements of the invention, and should not be construed as limiting the scope of the invention in any way.

For example, the system elements and their configuration as shown in FIGS. 1 and 2 may be varied in alternative embodiments. Similarly, the particular protocol steps in the diagrams of FIGS. 3, 4, 5 and 6 can be varied in alternative embodiments. As one more particular example, certain operations described as being performed by a reader in one embodiment can be performed at least in part by a verifier in an alternative embodiment, or may be performed jointly by cooperating reader and verifier elements in still further alternative embodiments. Those skilled in the art can make these and other modifications in the described embodiments in a straightforward manner.

In addition, although described in the context of EPC tags and associated kill and access PINs, the techniques of the present invention may be implemented in systems which utilize a wide variety of other types of RFID devices and associated control codes. Such control codes may be associated with tag functions other than kill and access.

Furthermore, the various simplifying assumptions made above in the course of describing the illustrative embodiments should also be viewed as exemplary rather than as requirements or limitations of the invention. In alternative embodiments, one or more of these assumptions need not apply.

These and numerous other alternative embodiments within the scope of the appended claims will be readily apparent to those skilled in the art.

What is claimed is:

1. A method for use in an RFID system comprising a plurality of RFID devices and at least one reader which communicates with one or more of the devices, the method comprising the steps of:

receiving an identifier transmitted by a given one of the RFID devices;

determining at least first and second codes, wherein the first code is a valid code for the identifier, and the second code is an invalid code for the identifier;

communicating with the given device to determine if the device is able to confirm that the first code is a valid code and the second code is an invalid code; and designating the given device as an authenticated device only if the given device is able to confirm that the first code is a valid code and the given device is able to confirm that the second code is an invalid code;

wherein the communicating step further comprises:

sending the first code to the given device and receiving from the given device in response to the first code a corresponding first validity indicator;

sending the second code to the given device and receiving from the given device in response to the second code a corresponding second validity indicator; and processing the first validity indicator received from the given device to determine if the given device is able to confirm that the first code is a valid code; and processing the second validity indicator received from the given device to determine if the given device is able to confirm that the second code is an invalid code.

2. The method of claim 1 wherein the identifier comprises an electronic product code (EPC).

3. The method of claim 2 wherein the given RFD device comprises an EPC tag.

4. The method of claim 1 wherein the first code comprises a valid kill code of the given RFID device.

5. The method of claim 1 wherein the determining step further comprises generating a set of q codes comprising q−1 invalid codes and a single valid code with the valid code being inserted in a particular position in the set.

6. The method of claim 5 wherein q=2.

7. The method of claim 5 wherein the communicating step further comprises transmitting a particular one of the codes to the given RFID device, and processing a response to determine whether or not the given RFID device considers the particular code to be valid.

8. The method of claim 7 wherein the transmitting and processing steps are repeated for each of the codes in the set of q codes.

9. The method of claim 5 wherein the set of q codes comprises a set $\{P_i^{(n)}\}_{n=1}^{q}$ selected uniformly at random without duplication from $\{0, 1\}^k$ with the valid code comprising a code $K_i$ which replaces a random element $P_i^{(j)}$ for $j \in_U \{1, 2, \ldots, q\}$.

10. The method of claim 5 wherein the set of q codes is generated pseudorandomly, utilizing a one-way hash function and a master key.

11. The method of claim 1 wherein the receiving, determining and communicating steps are each implemented at least in part in the reader.

12. The method of claim 1 wherein the receiving, determining and communicating steps are each implemented at least in part in a verifier which is separate from the reader and which communicates with the RFID device via the reader.

13. The method of claim 12 wherein, of the reader and the verifier, only the verifier is aware of which of the codes is the valid code for the identifier.

14. The method of claim 5 wherein the q codes are supplied to the reader by a verifier which is separate from the reader, and the reader is unaware as to which of the q codes is the valid code.

15. The method of claim 1 wherein the codes are supplied to the reader by a verifier only upon fulfillment by the reader of at least one specified condition.

16. The method of claim 15 wherein the codes are supplied by the verifier to the reader only if the reader can demonstrate to the verifier that the reader is in communication with the given RFID device.

17. A method for use in an RFID system comprising a plurality of RFID devices and at least one reader which communicates with one or more of the devices, the method comprising the steps of:
receiving an identifier transmitted by a given one of the RFID devices;
determining a code corresponding to the identifier, the code being utilizable to initiate a control function of the given RFID device;
transmitting the code to the given RFID device; and
designating the given RFID device as an authenticated device only if an expected response to transmission of the code is received from the given RFID device;
wherein the code comprises a predetermined control code that directs the given RFID device to enter an inactive mode of operation; and
wherein at least one of the given RFID device and the reader are configured to ensure that the given RFID device fails to enter the inactive mode of operation responsive to receiving the control code; and
wherein the expected response comprises an error code generated by the RFID device to indicate that the given RFID device failed to enter the inactive mode of operation responsive to receiving the control code.

18. The method of claim 17 wherein the code comprises a valid kill code of the given RFID device, and wherein at least one of the given RFID device and the reader are configured such that the RFID device registers insufficient power for the kill code.

19. A method for use in an RFID system comprising a plurality of RFID devices and at least one reader which communicates with one or more of the devices, the method comprising the steps of:
receiving an identifier transmitted by a given one of the RFID devices;
transmitting a first code to the given RFID device;
receiving a second code from the given RFID device responsive to transmission of the first code to the given RFID device; and
determining if the second code is a valid code for the given RFID device;
wherein each of the first and second codes comprises a code which is stored in the given RFID device and utilized to initiate a corresponding control function of the given RFID device by directing the given RFID device to enter a corresponding mode of operation; and
wherein release of the second code by the given RFID device is conditioned upon confirmation of the validity of the first code by the given RFID device.

20. The method of claim 19 wherein the given RFID device comprises an EPC tag.

21. The method of claim 19 wherein the first code comprises a valid access code of the given RFID device.

22. The method of claim 19 wherein the second code comprises a valid kill code of the given RFID device.

23. The method of claim 20 wherein the second code comprises a particular one of a plurality of portions of a valid kill code of the given RFID device.

24. An apparatus for use in an RFID system comprising a plurality of RFID devices and at least one reader which communicates with one or more of the devices, the apparatus comprising:
a processing device comprising a processor coupled to a memory, the processing device being configured to receive an identifier transmitted by a given one of the RFID devices, to determine at least first and second codes, wherein the first code is a valid code for the identifier, and the second code is an invalid code for the identifier, to communicate with the given device to determine if the device is able to confirm that the first code is a valid code and the second code is an invalid code, and to designate the given device as an authenticated device only if the given device is able to confirm that the first code is a valid code and the given device is able to confirm that the second code is an invalid code;
wherein the processing device is further configured to send the first code to the given device and to receive from the given device in response to the first code a corresponding first validity indicator, to send the second code to the given device and to receive from the given device in response to the second code a corresponding second validity indicator, to process the first validity indicator received from the given device to determine if the given device is able to confirm that the first code is a valid code, and to process the second validity indicator received from the given device to determine if the given device is able to confirm that the second code is an invalid code.

25. The apparatus of claim 24 wherein the processing device is implemented in the reader.

26. The apparatus of claim 24 wherein the processing device is implemented in a verifier which is separate from the reader but which communicates with the RFID devices via the reader.

27. An apparatus for use in an RFID system comprising a plurality of RFID devices and at least one reader which communicates with one or more of the devices, the apparatus comprising:
a processing device comprising a processor coupled to a memory, the processing device being configured to receive an identifier transmitted by a given one of the RFID devices, to transmit a first code to the given RFID device, to receive a second code from the given RFID device responsive to transmission of the first code to the given RFID device, and to determine if the second code is a valid code for the given RFID device;
wherein release of the second code by the given RFID device is conditioned upon confirmation of the validity of the first code by the given RFID device; and
wherein each of the first and second codes comprises a code which is stored in the given RFID device and utilized to initiate a corresponding control function of the given RFID device by directing the given RFID device to enter a corresponding mode of operation.

28. An RFID device for use in an RFID system comprising a plurality of RFID devices and at least one reader which communicates with one or more of the devices, the RFID device being configured to transmit an identifier to the reader, to receive from the reader at least first and second codes, wherein the first code is a valid code for the identifier, and the second code is an invalid code for the identifier, and to transmit information to the reader indicating confirmation that the first code is a valid code and the second code is an invalid code;

wherein the RFID device receives the first code from the reader and in response to receipt of the first code sends the reader a corresponding first validity indicator; and wherein the RFID device receives the second code from the reader and in response to receipt of the second code sends the reader a corresponding second validity indicator;

the first and second validity indicators sent from the RFID device to the reader providing sufficient information to permit designation of the RFID device as an authenticated device based on a determination as to whether the RFID device is able to confirm which of the first and second codes is the valid code, said determination comprising a first determination that the first code is a valid code for the identifier and a second determination that the second code is an invalid code for the identifier.

* * * * *